(12) United States Patent
Riordan et al.

(10) Patent No.: US 12,454,373 B2
(45) Date of Patent: *Oct. 28, 2025

(54) STUD-PROPELLING MECHANISMS FOR SECURING A LAUNCH VEHICLE TO A LANDING PLATFORM, AND ASSOCIATED SYSTEMS AND METHODS

(71) Applicant: Blue Origin Manufacturing, LLC, Kent, WA (US)

(72) Inventors: Brian Riordan, Kent, WA (US); Shane Draney, Maple Valley, WA (US); Rory Arp, Auburn, WA (US); Robert E. McMullen, Redmond, WA (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/524,914

(22) Filed: Nov. 30, 2023

(65) Prior Publication Data

US 2024/0092508 A1 Mar. 21, 2024

Related U.S. Application Data

(63) Continuation of application No. 17/369,896, filed on Jul. 7, 2021, now Pat. No. 11,884,427.

(51) Int. Cl.
*B64G 1/62* (2006.01)
*B63B 35/53* (2006.01)
(Continued)

(52) U.S. Cl.
CPC .............. *B64G 1/625* (2023.08); *B63B 35/53* (2013.01); *B64G 1/002* (2013.01); *B64G 5/00* (2013.01); *B64G 2005/005* (2013.01)

(58) Field of Classification Search
CPC .............. B64G 1/107162; B64G 1/625; B64G 2001/1071; B64G 2005/005; B64F 1/12; B64F 1/125; B63B 21/28; E02D 5/806
See application file for complete search history.

(56) References Cited

U.S. PATENT DOCUMENTS 2,475,597 A 7/1949 Dickson
2,855,817 A 10/1958 Kope
(Continued)

FOREIGN PATENT DOCUMENTS

| DE | 10326430 | 1/2005 |
|---|---|---|
| WO | 2015069755 | 5/2015 |
| WO | 2016172587 | 10/2016 |

OTHER PUBLICATIONS

Bement, Laurence J., "Small-Scale Explosive Seam Welding," https://ntrs.nasa.gov/archive/nasa/casi.ntrs.nasa.gov/19740022827.pdf, Williamsburg, Virginia, May 30-Jun. 1, 1972, 35 pages.**.

(Continued)

*Primary Examiner* — Nicholas McFall
(74) *Attorney, Agent, or Firm* — Hogan Lovells US LLP

(57) ABSTRACT

Stud-propelling mechanisms for securing a launch vehicle to a landing platform, and associated systems and methods, are disclosed. A representative system includes a fastening mechanism carried by a landing support element of a portion of a launch vehicle, the mechanism configured to fasten the landing support element to the landing surface when the launch vehicle portion is on the landing surface. The fastening mechanism can include a barrel structure for propelling a stud and an interference portion positioned to receive the stud upon activation of an energetic material that propels the stud. The stud can bind in the interference portion and in the landing surface to fasten the landing support element to the landing surface. A representative method includes auto- (Continued)

matically fastening a portion of a launch vehicle to a landing surface using a stud carried by the portion of the launch vehicle.

27 Claims, 7 Drawing Sheets

(51) Int. Cl.
*B64G 1/00* (2006.01)
*B64G 5/00* (2006.01)

(56) References Cited

U.S. PATENT DOCUMENTS

| | | | |
|---|---|---|---|
| 3,170,433 | A | 2/1965 | Gardiner |
| 3,399,646 | A | 9/1968 | Vincent |
| 3,431,880 | A | 3/1969 | Pannell |
| 3,434,197 | A | 3/1969 | Davenport |
| 3,577,949 | A | 5/1971 | Mueller |
| 3,854,027 | A | 12/1974 | Ettinger |
| 5,474,226 | A | 12/1995 | Joseph |
| 6,560,846 | B1 | 5/2003 | Shioya et al. |
| 7,530,485 | B1 | 5/2009 | Brasher et al. |
| 10,737,809 | B2 | 8/2020 | Carreker |
| 2004/0069832 | A1 | 4/2004 | Banker |
| 2006/0254039 | A1 | 11/2006 | Daehn |
| 2011/0017872 | A1 | 1/2011 | Bezos et al. |
| 2018/0105287 | A1 | 4/2018 | Carreker |
| 2023/0012410 | A1 | 1/2023 | Riordan et al. |

OTHER PUBLICATIONS

Inverse—Mike Brown, "Falcon Heavy: How it Mastered Its Incredible Drone Ship Landing," https://www.inverse.com/article/54837-falcon-heavy-how-it-mastered-its-incredible-drone-ship-landing, Apr. 12, 2019, 3 pages.**.

Fecht, Sarah., "What Happens After You Land a Rocket On a Drone Ship," Popular Science, https://www.popsci.com/what-happens-after-you-land-rocket-on-drone-ship/, Apr. 9, 2016, 2 pages.**.

Hosseinzadeh et al., "Experimental Study of High-Velocity Projectile Impact Welding," https://link.springer.com/article/10.1007/s40799-018-0262-1, Jun. 4, 2018, 6 pages.**.

SpaceXFleet.com., "Octagrabber—Booster Recovery," https://spacexfleet.com/Octagrabber, accessed Feb. 5, 2021, 5 pages.**.

Website: Image Industries, Inc., Weld Studs, https://www.imageindustries.com/product/welding-products/product-type/weld-studs/, accessed Jun. 2021, 3 pages.**.

Website: Image Industries, Inc., Stud Weld Equipment, https://www.imageindustries.com/product/welding-products/product-type/stud-weld-equipment/, accessed Jun. 2021, 3 pages.**.

Image Industries, Inc., "Welder's Guide to ARC Stud Welding Process Discussion: Focusing on Plunge," https://imging-assets-prod.s3.amazonaws.com/DOCUMENTS/TRAINING_GUIDES/DRAWN_ARC_STUD_WELDING_FOCUSING_ON_PLUNGE.PDF, Jan. 14, 2008, 5 pages.**.

Image Industries Inc., "Welders Guide to ARC Stud Welding," https://imging-assets-prod.s3.amazonaws.com/DOCUMENTS/TRAINING_GUIDES/ARC_WELDER'S_GUIDE_REV_2_2003-09.PDF, Sep. 2003, 17 pages.**.

Bernard et al., "From IXV to Space Rider: CMC Thermal Protection System evolutions", 8th European Conference for Aeronautics and Space Sciences (EUCASS), DOI: 10.13009/EUCASS2019-991, 2019, 8 pages.

STUD-PROPELLING MECHANISMS FOR SECURING A LAUNCH VEHICLE TO A LANDING PLATFORM, AND ASSOCIATED SYSTEMS AND METHODS

CROSS-REFERENCE TO RELATED APPLICATION

The present application is a continuation of U.S. patent application Ser. No. 17/369,896, filed Jul. 7, 2021, which is incorporated herein by reference.

TECHNICAL FIELD

The present disclosure is directed generally to stud-propelling mechanisms for securing a launch vehicle to a landing platform, and associated systems and methods. Representative aspects of the present disclosure include automatically fastening a landing support element of a reusable launch vehicle stage to a surface, in response to landing the stage on the surface.

BACKGROUND

Rockets have been used for many years to launch human and non-human payloads into orbit. Such rockets delivered the first humans to space and to the Moon, and have launched countless satellites into the Earth's orbit and beyond. Such rockets are used to propel unmanned space probes to deliver structures, supplies, and personnel to the orbiting International Space Station.

Launch service providers continually seek to reduce the cost of launching a payload into space or the upper atmosphere. One approach for reducing such costs is to retrieve one or more stages of a rocket for reuse. In one particular approach, a rocket stage is landed vertically (e.g., tail-down or nozzle-down) and then refurbished for additional launches. One challenge with this approach is that it may be difficult to land the rocket stage in a precise enough position so as to utilize ground-based systems to secure the rocket stage in a vertical orientation. Additionally, environmental conditions at the landing site may include sufficient wind forces to tip the stage over after landing. In one particular approach, a rocket stage is landed vertically on a floating platform (such as a sea-going platform). A floating platform will move in 6 degrees of freedom as it is subjected to sea conditions, which presents the additional challenge of keeping the rocket stage safely and securely upright after landing. An unsecured, vertical rocket stage on a moving platform subjected to winds presents a safety hazard for nearby personnel and equipment. Accordingly, one challenge associated with landing a vehicle (such as a rocket stage) vertically is ensuring the vehicle is adequately supported after landing. Aspects of the present disclosure are directed to addressing this challenge and other challenges.

BRIEF DESCRIPTION OF THE DRAWINGS

In the drawings, wherein the same reference number indicates the same element throughout the views.

DETAILED DESCRIPTION

Embodiments of the technology disclosed herein are directed generally to stud-propelling mechanisms for securing a launch vehicle to a landing platform, and associated systems and methods. Several embodiments of the present technology are directed to securing a portion of a launch vehicle (such as a booster stage) to a landing surface, but the present technology can be implemented in other systems in which rapid fastening between two or more objects is desired. A representative system includes a launch vehicle portion, one or more landing support elements carried by the launch vehicle portion and positioned to support the launch vehicle portion on a landing surface, and a fastening mechanism carried by at least one of the landing support elements and configured to fasten the landing support element to the landing surface when the launch vehicle portion is on the landing surface. The fastening mechanism can include a barrel structure positioned to receive a stud and an energetic material. Upon activation of the energetic material, the stud moves within the barrel structure toward the landing surface. The stud embeds in the landing surface and binds in an interference portion of the fastening mechanism to fasten the landing support element to the landing surface. In some representative systems, the fastening mechanism can include a plate element that includes the interference portion. In further representative systems, the interference portion can be part of the barrel structure. A representative method includes automatically fastening a portion of a launch vehicle to a landing surface using a stud carried by the portion of the launch vehicle.

Several details describing structures and processes that are well-known and often associated with energetic materials and launch vehicles are not set forth in the following description to avoid obscuring other aspects of the disclosure. Moreover, although the following disclosure sets forth several embodiments, several other embodiments can have configurations, arrangements, and/or components that are different than those described in this section. In particular, other embodiments may have additional elements, and/or may lack one or more of the elements described below with reference to FIGS. 1-6.

Figure 1:
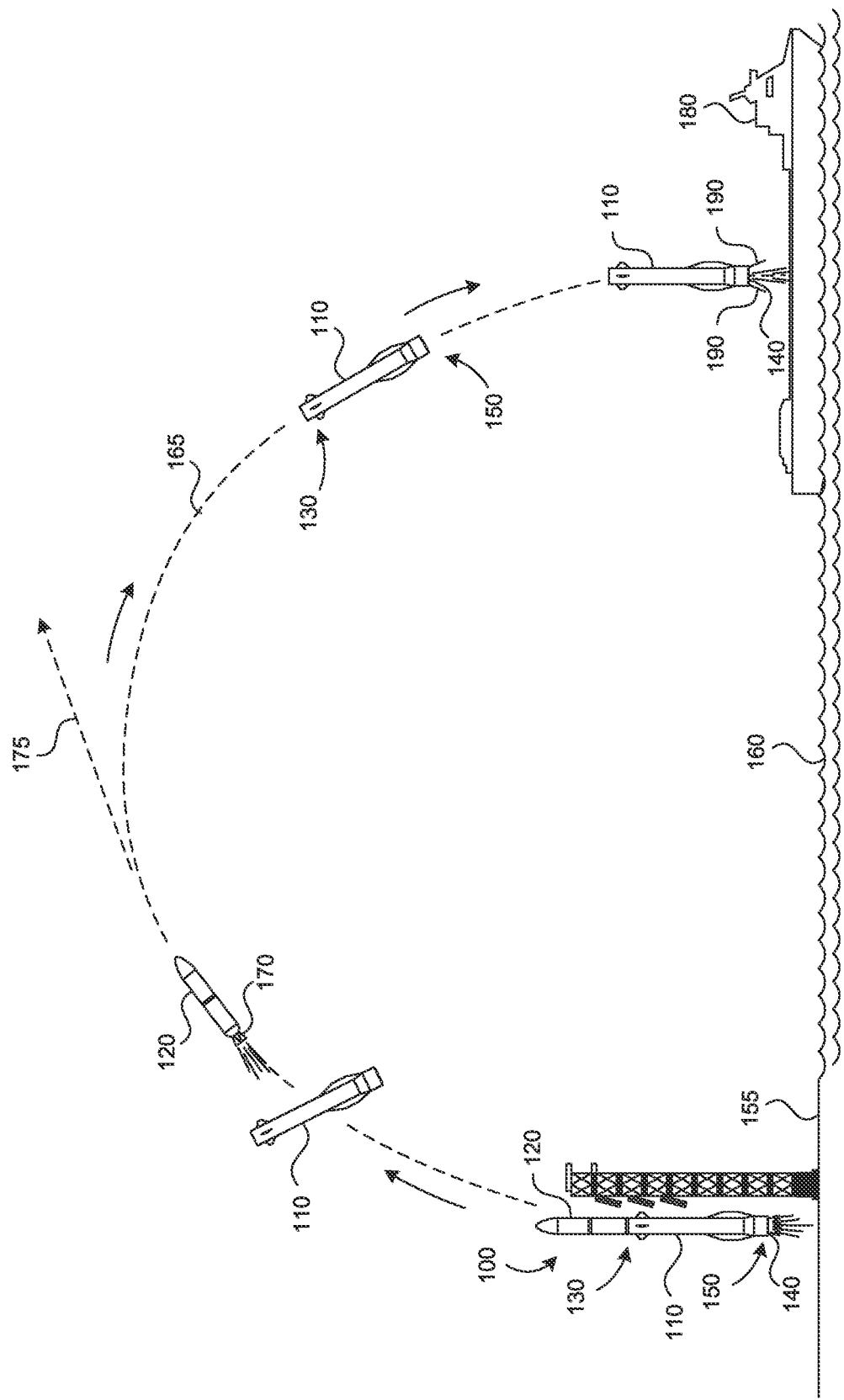
FIG. 1 is a schematic diagram illustrating a mission profile of a launch vehicle including a launch vehicle portion that lands on a surface.

FIG. 1 is a schematic diagram illustrating a representative mission profile of an aerospace system including a launch vehicle, in which at least a portion of the launch vehicle lands in a controlled manner on a surface. A launch vehicle 100 can include multiple portions (e.g., stages), such as a first or booster stage 110 and one or more second or upper stages 120. The launch vehicle 100 can be a space launch vehicle for carrying humans or cargo to space or it can be a launch vehicle for moving humans or cargo within the Earth's atmosphere. Accordingly, although reference may be made to orbital space, embodiments of the present technology may be used with portions (e.g., stages) of launch vehicles that carry out suborbital missions.

Although the upper stage 120 is stacked on top of the booster stage 110 in the illustrated mission profile, in other embodiments the launch vehicle 100 and variations thereof can have other configurations without departing from the present disclosure. For example, the upper stage 120 and the booster stage 110 can be positioned side-by-side and attached to each other during ascent with a suitable separation system. In another example, two or more booster stages 110 or variations thereof can be positioned around the upper stage 120 in a "strap-on" type configuration. Accordingly, the present disclosure is not limited to the particular launch vehicle configuration illustrated in FIG. 1. Although embodiments of the present technology may be applied to any of the portions (e.g., stages) of the launch vehicle 100, such that embodiments of the present technology may secure any of the portions to a surface, a representative embodiment is described in more specific detail below with regard to the booster stage 110. The booster stage 110 includes a forward end 130 and one or more rocket engines 140 (including one or more exhaust nozzles) positioned toward an aft (tail) end 150.

In the illustrated example, the launch vehicle 100 takes off from a coastal or other land-based launch site 155 and then turns out over a body of water 160 (such as an ocean). At some point, such as after a high-altitude booster engine cutoff (BECO) operation, the booster stage 110 separates from the second (e.g., upper) stage 120 and continues along a ballistic trajectory 165. The second (e.g., upper) stage 120 can include one or more engines 170 that ignite and propel the second stage 120 into a higher trajectory 175 for orbital insertion or other destinations or activities.

The booster stage 110 reenters the Earth's atmosphere before or after reorienting so that the aft end 150 is pointing in the direction of motion (tail-first). The booster stage 110 descends toward a landing platform 180, which can be a floating (e.g., sea-going) platform, although it can alternatively be a fixed platform on land (for example, the mission can take place entirely over land, or over a combination of land and water). The booster stage 110 can land tail-first on the landing platform 180 using thrust from the one or more rocket engines 140. The booster stage 110 can carry one or more landing support elements 190, which can include suitable shock-absorbing landing gear (e.g., one or more landing legs). The landing support elements 190 can support the booster stage 110 in an upright position after landing. As described in additional detail below, in response to landing, upon landing, or after landing (such as shortly after landing), the landing support elements 190 can be fastened to the landing platform 180 in accordance with embodiments of the present disclosure.

The foregoing mission profile is provided as an example only. Embodiments of the present technology can be used to secure any portion (e.g., stage) of a launch vehicle after the portion lands in any orientation on any suitable landing support element 190, with or without thrust (e.g., with a parachute to control the rate of descent).

Figure 2:
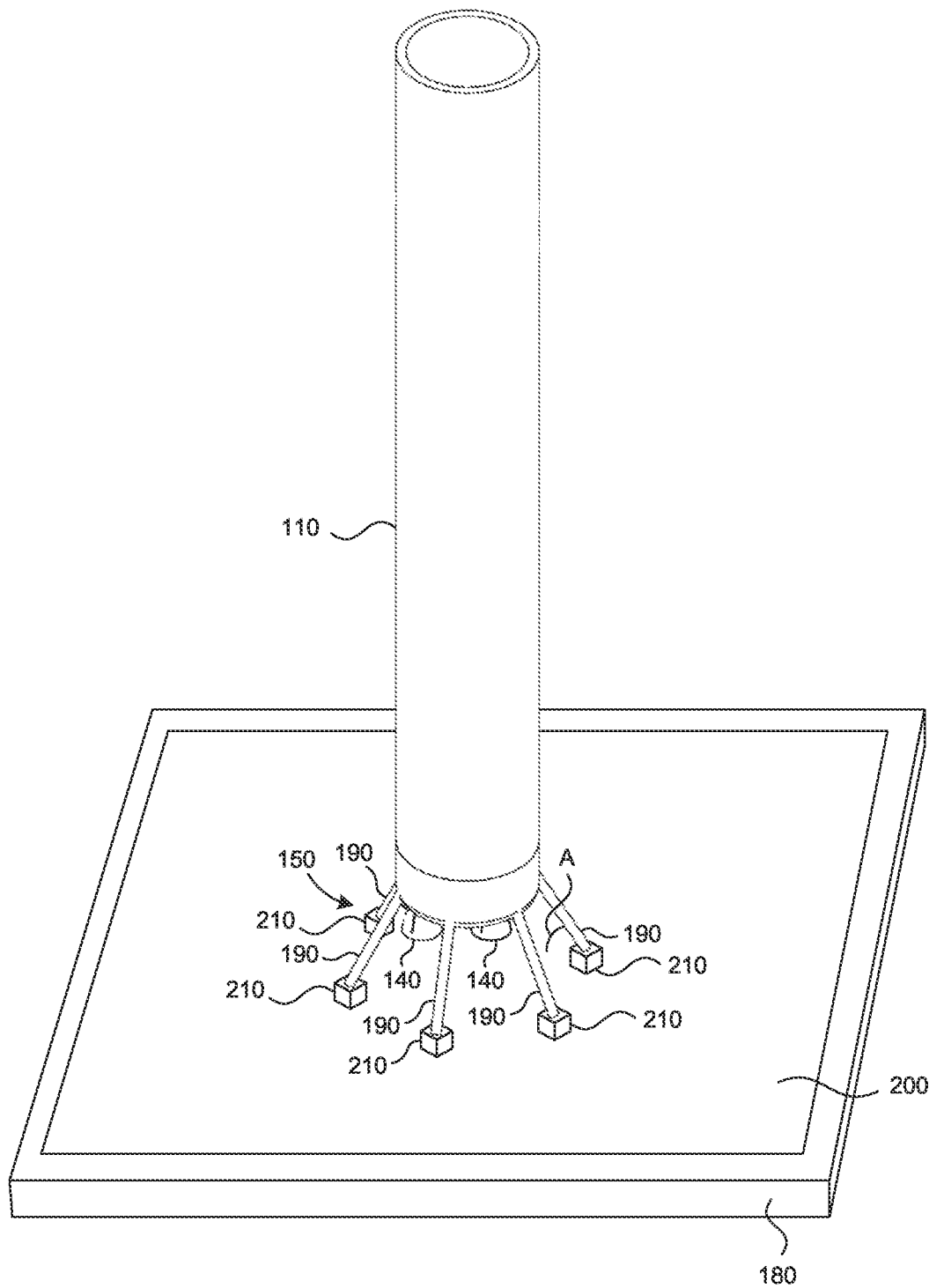
FIG. 2 illustrates a partially schematic view of a portion of a launch vehicle (e.g., a booster stage) after it has landed on a landing surface, which can be a landing surface on a floating landing platform or on land.

FIG. 2 illustrates a partially schematic view of a portion of a launch vehicle (e.g., the booster stage 110) after it has landed on a landing surface 200, which can be a landing surface 200 on the landing platform 180. The landing surface 200 can include a metal material, such as mild steel or another suitable metal material. The landing surface 200 can span an area positioned to receive the portion of the launch vehicle. One or more (e.g., all) of the landing support elements 190 can include one or more fastening mechanisms 210 positioned to contact the landing surface 200 as (or after) the portion of the launch vehicle (e.g., the booster stage 110) lands. Upon landing, each fastening mechanism 210 can automatically secure (e.g., fasten with a stud) the booster stage 110 to the landing surface 200 via the one or more landing support elements 190. Although five landing support elements 190 are visible in FIG. 2, and although the landing support elements 190 are illustrated as being oriented at an oblique angle A relative to the landing surface 200, embodiments of the present technology can implement more or fewer landing support elements 190 and/or the landing support elements 190 can be oriented at other angles A relative to the landing surface 200.

Figure 3:
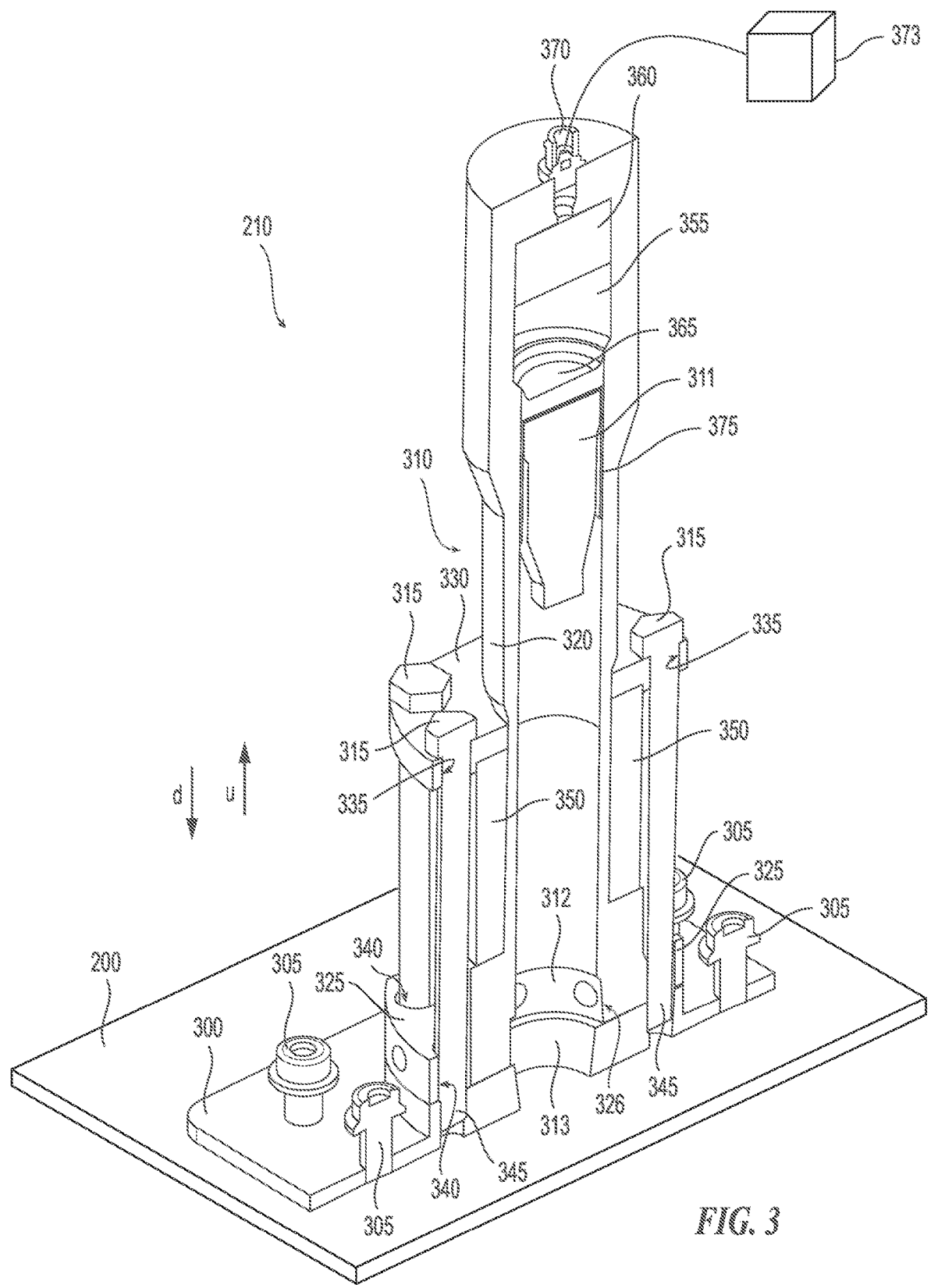
FIG. 3 illustrates a partially schematic cross-sectional perspective view of a fastening mechanism suitable for being carried by a landing support element, configured in accordance with embodiments of the present technology.

FIG. 3 illustrates a partially schematic cross-sectional perspective view of a fastening mechanism 210 suitable for being carried by a landing support element 190 and configured in accordance with embodiments of the present technology. The sectional view in FIG. 3 shows half of the fastening mechanism 210, which is symmetrical across the plane of the cross-section. The fastening mechanism 210 can include a plate element 300 configured to be attached to a bottom portion of a landing support element 190 (see FIG. 2 and the corresponding description above, and FIGS. 4A and 4B and their corresponding descriptions below) via one or more fasteners 305.

The fastening mechanism 210 can further include a barrel structure 310 positioned to receive a stud 311. The stud 311 is configured to be propelled downwardly along direction d through the barrel structure 310 to penetrate and bind in the landing surface 200. When activated, the stud 311 also binds to the plate element 300 and/or the barrel structure 310 to fasten the fastening mechanism 210 to the landing surface 200. For example, in some embodiments, the plate element 300 includes an interference portion 313, which can be a hole or passageway in the plate element 300. Upon activation of the fastening mechanism 210, the stud 311 can bind to the interference portion 313 and the landing surface 200, which fastens the plate element 300 (and the landing support element 190 carrying the plate element 300) to the landing surface 200. In some embodiments, the stud 311 can bind to an interference portion 312 at an end of the barrel structure 310. Function of the fastening mechanism 210 is described in additional detail below in connection with FIGS. 4A and 4B.

To manage recoil forces from the action of the propelled stud 311, the barrel structure 310 can be movable relative to the plate element 300 (for example, upwardly along direction u). To absorb some or all of the recoil energy and reduce shocks to the vehicle structures, the fastening mechanism 210 can include one or more recoil absorption elements positioned to crush or otherwise deform as the barrel structure 310 moves. FIG. 3 shows representative structures for managing and absorbing recoil energy.

For example, in some embodiments, the fastening mechanism 210 includes one or more fasteners 315 forming one or more track elements along which the barrel structure 310 can move. The barrel structure 310 can include a barrel portion or barrel 320 and a flange portion 325 extending generally radially outwardly from a muzzle portion 326 of the barrel 320. The fasteners 315 can extend through the flange portion 325 (via through-holes 340) and engage the plate element 300 via a threaded engagement 345 connecting each fastener 315 to the plate element 300, or via another suitable engagement, which can be releasable. Accordingly, the barrel structure 310 can move along the fasteners 315 (i.e., the through-holes 340 can move axially along the fasteners 315).

The fastening mechanism 210 can include an upper restraint plate 330 positioned to limit movement of the barrel structure 310 away from the plate element 300 (for example, the flange portion 325 can be restrained by the upper restraint plate 330 as the barrel structure 310 moves upwardly). The upper restraint plate 330 can fully or partially encircle the barrel 320. The fasteners 315 can extend between the plate element 300 and the upper restraint plate 330. The fasteners 315 can also extend through the upper restraint plate 330 via holes 335.

In some embodiments, the fastening mechanism 210 can include one or more recoil absorption elements 350 operatively positioned between the barrel structure 310 and the landing support element 190. For example, one or more recoil absorption elements 350 can be positioned between the flange portion 325 and the upper restraint plate 330 to deform and absorb recoil energy as the barrel structure 310 moves away from the plate element 300 (e.g., as the flange portion 325 moves toward the upper restraint plate 330). The recoil absorption elements 350 can include crushable or plastically deformable materials or structures suitable for permanently deforming (e.g., crushing) as the barrel structure 310 moves away from the plate element 300. For example, the recoil absorption elements 350 can include corrugated aluminum cylinders or tubes.

To facilitate propelling the stud 311, the barrel structure 310 can include a breech portion 355 configured to contain an energetic material 360. The energetic material 360 can include a smokeless powder or another propellant suitable for propelling the stud 311 through the barrel structure 310. In some embodiments, the barrel structure 310 can include an obturator 365 positioned inside the barrel structure 310 between the stud 311 and the energetic material 360, to support and/or contain the energetic material 360 within the breech portion 355. The obturator 365 can be configured to break, open, and/or otherwise move upon activation of the energetic material 360. In some embodiments, the obturator 365 can be omitted and a sabot (element 375 in FIG. 3, described below) can seal the energetic material 360.

To activate the energetic material 360, the fastening mechanism 210 can include an initiator 370, which can include any suitable initiation device for activating the energetic material 360, such as an initiation device that includes its own primary and/or booster charge. In some embodiments, two or more initiators 370 may be included (e.g., for redundancy). In some embodiments, system(s) implementing the fastening mechanism 210 can include a controller 373 configured to receive instructions to initiate the initiator 370 or programmed with instructions that, when executed, carry out operations associated with the fastening mechanism 210. The launch vehicle can carry the controller 373 (for example, on or within the landing support element 190, on or within components of the fastening mechanism 210, or elsewhere on or within the launch vehicle), or the controller 373 can be separate from the launch vehicle, with suitable wireless or wired connections for communicating with the initiator 370.

In some embodiments, the stud 311 can include a tapered element shaped and sized to pass through the barrel structure 310 until it binds in the interference portion 313 of the plate element 300. In some embodiments, the interference portion 313 can be suitably shaped and sized to have a smaller inner diameter than an outer diameter of the stud 311 to facilitate binding the stud 311 to the interference portion 313. In some embodiments, the fastening mechanism 210 can include a sabot 375 positioned to hold the stud 311 in the barrel structure 310 until the energetic material 360 is activated. In other embodiments, however, a sabot may be omitted. In some embodiments, the stud 311 can include one or more splines or grooves. The splines or grooves can strengthen the bond between the stud 311, the landing surface 200, and/or the interference portion 313. The stud 311 can include steps or ridges between changes in diameter, which can increase the energy required to advance the stud 311 into the interference portion 313, thereby controlling (e.g., limiting) the depth to which the stud 311 penetrates into the interference portion 313. This approach can reduce the possibility of the stud 311 passing entirely through the fastening mechanism 210 instead of performing its binding function.

Figure 4A:
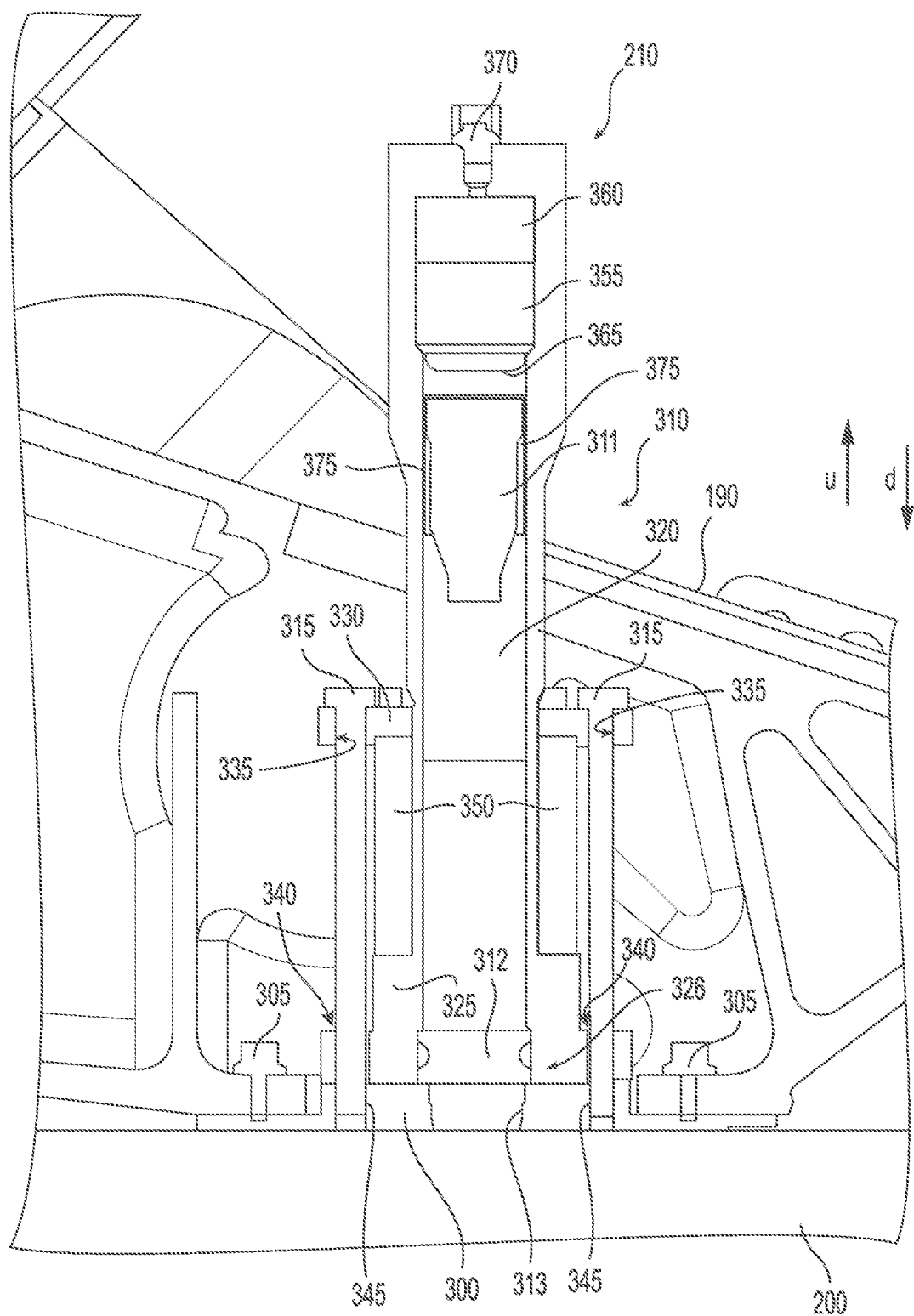
FIG. 4A illustrates a partially schematic side cross-sectional view of the fastening mechanism shown in FIG. 3, carried by a landing support element and positioned on a landing surface, prior to activation of the fastening mechanism.

FIG. 4A illustrates a partially schematic side cross-sectional view of the fastening mechanism 210 carried by a landing support element 190, with the landing support element 190 and the fastening mechanism 210 positioned on the landing surface 200. In FIG. 4A, the fastening mechanism 210 is shown prior to activation. The fasteners 305 can extend through a portion of the landing support element 190 and engage the plate element 300 (for example, via a releasable connection such as a threaded engagement). In other embodiments, the fastening mechanism 210 can be attached to the landing support element 190 in other ways. Generally, the fastening mechanism 210 can be attached to the landing support element 190 in a manner that facilitates the plate element 300 contacting the landing surface 200 upon landing of the portion of the launch vehicle. When the fastening mechanism 210 is activated, the initiator 370 or another suitable device activates the energetic material 360, which pressurizes the breech portion 355 and forces the stud 311 toward the landing surface 200. If there is an obturator 365, the obturator 365 may follow the stud 311, and it may create a seal as it travels through the barrel 320. The stud 311 embeds into the landing surface 200 and binds in the interference portion 313.

Figure 4B:
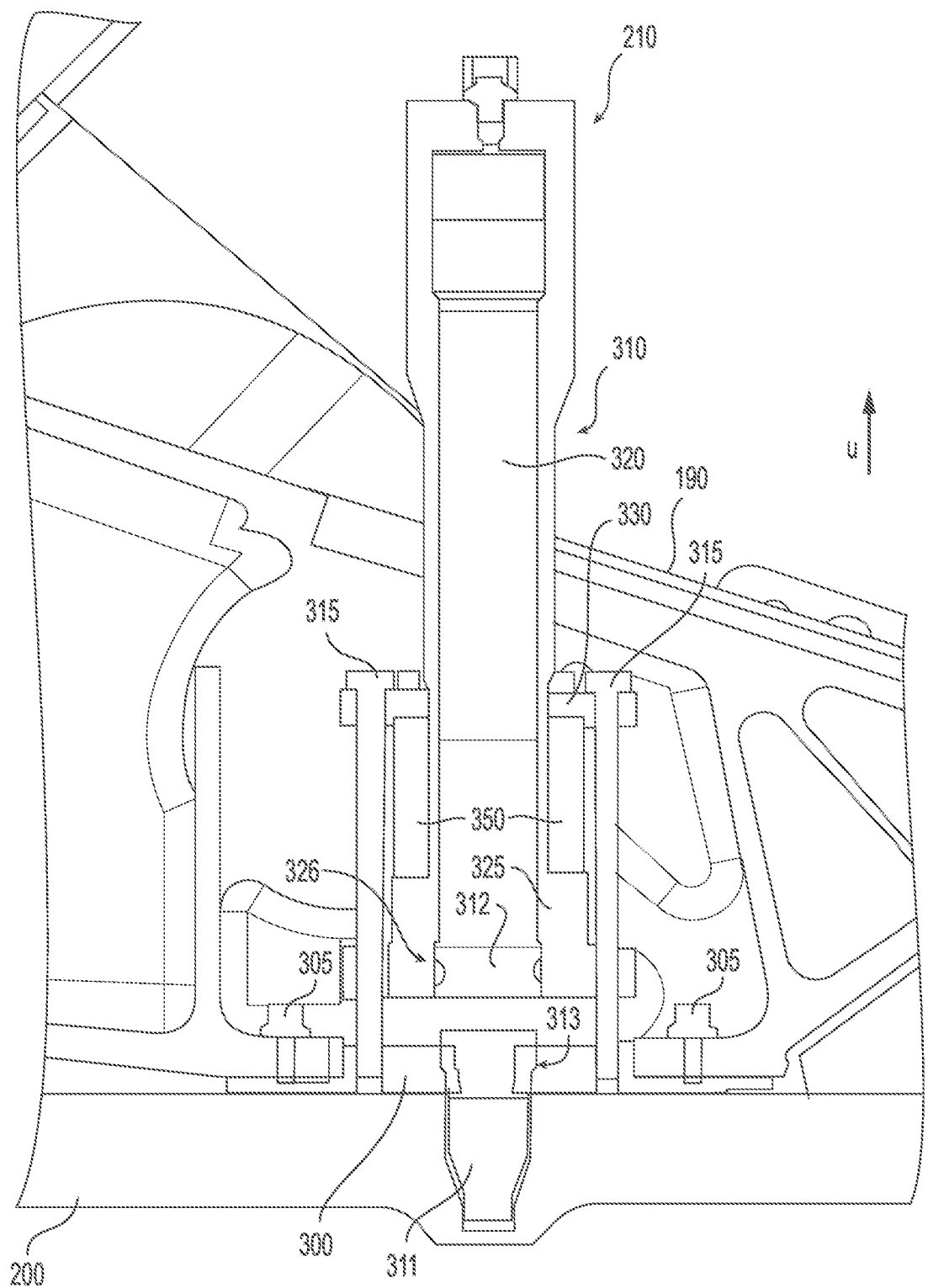
FIG. 4B illustrates a partially schematic side cross-sectional view of the fastening mechanism shown in FIG. 3, carried by a landing support element and positioned on a landing surface, after the fastening mechanism has functioned and fastened the landing support element to the landing surface.

FIG. 4B illustrates a partially schematic side cross-sectional view of the fastening mechanism 210 carried by the landing support element 190, with the fastening mechanism 210 shown after it has functioned and fastened the landing support element 190 to the landing surface 200. In FIG. 4B, the stud 311 is embedded into the landing surface 200 and bound to the interference portion 313 of the plate element 300. The barrel structure 310 is moved away from the landing surface 200 relative to the position of the barrel structure 310 in FIG. 4A (i.e., the barrel structure 310 has moved upwardly along arrow u), and the one or more recoil absorption elements 350 are shown in a crushed or deformed configuration, having absorbed some of the recoil energy.

The stud 311 penetrates into the landing surface 200, which fastens the stud 311 to the landing surface 200. To facilitate bonding between the stud 311 and the landing surface 200, the stud 311 can be made of a metal (e.g., through-hardened H13 steel, S7 steel, another type of steel, or another suitable metal material), and the landing surface 200 can also be made of a metal (e.g., steel, such as ASTM A516 Gr. 70) suitable for forming a cold-welded and/or swaged bond with the stud 311. In some embodiments, the stud 311 can include a tip made from a material that is harder than the material forming the remainder of the stud 311 (for example, a tungsten tip). When the stud 311 is embedded in the landing surface 200 and bound in the interference portion 312 of the barrel structure 310 and/or the interference portion 313 of the plate element 300, the fastening mechanism 210 and the landing support element 190 are fixed to the landing surface 200. Some fastening mechanisms configured in accordance with embodiments of the present technology may include vents in the barrel or other vents to release pressure as the barrel recoils.

After the fastening mechanism 210 has been activated, the landing support element 190 is secured to the landing surface 200, and therefore the portion of the launch vehicle (e.g., the booster stage 110) is secured to the landing surface 200. With further reference to FIG. 4B, the landing support element 190 can be removed from the fastening mechanism 210 by releasing one or more fasteners in the fastening mechanism 210, or otherwise disassembling components of the fastening mechanism 210. For example, the fasteners 305 can be removed to free the landing support element 190 from the plate element 300. In some embodiments, the fasteners 315 can be removed to release the barrel structure 310 from the plate element 300. In general, freeing the landing support element 190 from the fastening mechanism 210 can include disconnecting the landing support element 190 from the interference portion 312 of the barrel structure 310 and/or the interference portion 313 of the plate element 300. In some embodiments, operators can remove the stud 311 from the landing surface 200 using hydraulic tools after releasing the barrel structure 310 from the remainder of the assembly by removing the fasteners 315. In some embodiments, the fasteners 315 may be cut instead of unscrewed.

Although movement of the barrel structure 310 relative to the plate element 300 can be facilitated by allowing the barrel structure 310 to move upwardly along the fasteners 315, as indicated by the upward direction arrow u, other embodiments can include other suitable mechanisms for facilitating movement of the barrel structure 310 relative to the plate element 300. Further, although one or more recoil absorption elements 350 can be included between the upper restraint plate 330 and the flange portion 325, the recoil absorption elements 350 can be positioned in other configurations, such as between another upper restraint and another feature connected to the barrel structure 310. For example, FIGS. 5A and 5B illustrate another representative structure for managing and absorbing recoil energy.

Figure 5A:
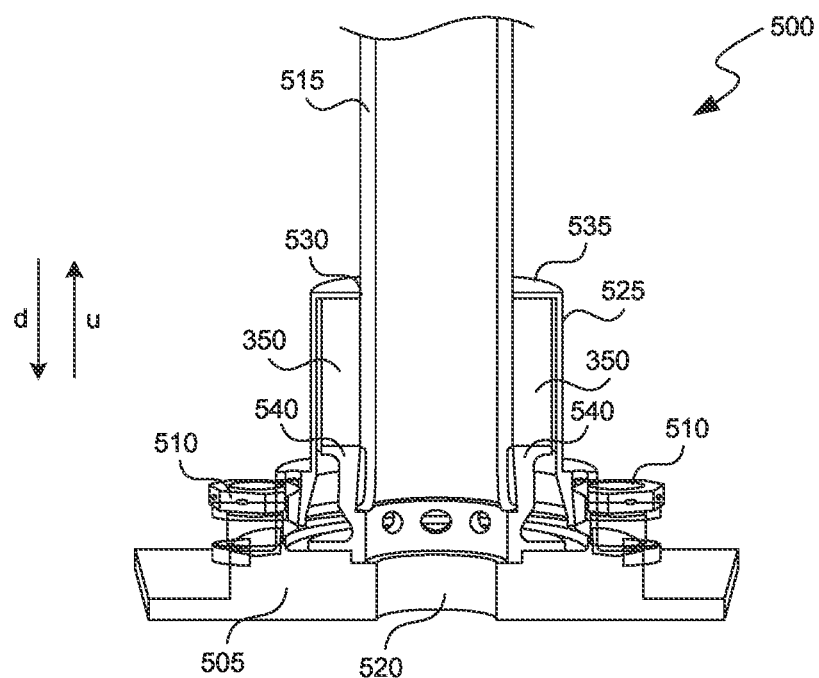
FIG. 5A illustrates a partially schematic cross-sectional view of portions of a fastening mechanism configured in accordance with further embodiments of the present technology, prior to activation.
Figure 5B:
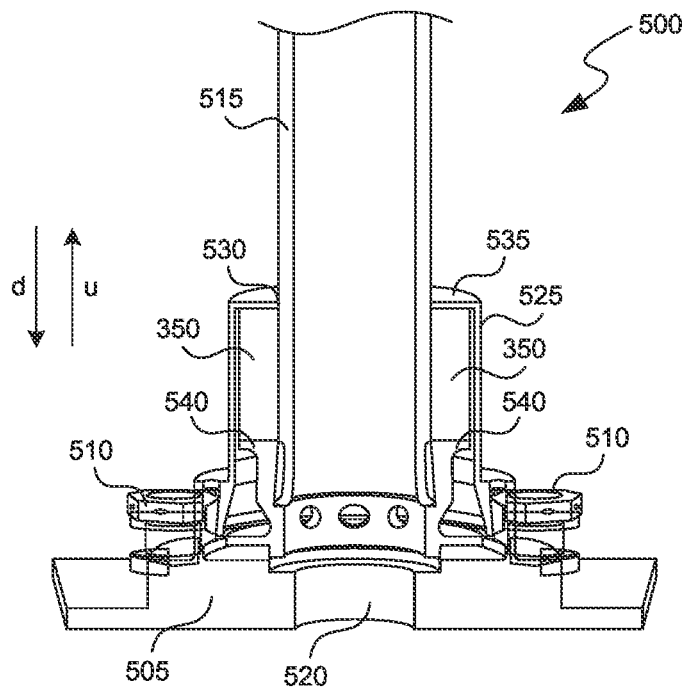
FIG. 5B illustrates a partially schematic cross-sectional view of the fastening mechanism shown in FIG. 5A, after activation.

FIG. 5A illustrates a partially schematic cross-sectional view of portions of a fastening mechanism 500 configured in accordance with further embodiments of the present technology, prior to activation. FIG. 5B illustrates a partially schematic cross-sectional view of the fastening mechanism 500 shown in FIG. 5A, after activation, to illustrate operation of a representative structure for managing and absorbing recoil energy. The fastening mechanism 500 may be generally similar to the fastening mechanism 210 described above with regard to FIGS. 2-4B. For example, the fastening mechanism 500 can include a plate element 505 configured to be attached to a bottom portion of a landing support element 190 (see FIG. 2) via one or more fasteners 510. The fastening mechanism 500 can include a barrel structure 515 for receiving a stud 311 (see FIGS. 2-4B) that is propelled downwardly along direction d through the barrel structure 310 to penetrate and bind in the landing surface 200 and in an interference portion 520 of the plate element 505, similar to the function of the fastening mechanism 210 described above. Accordingly, the portions of the barrel structure 515 that are not shown in FIGS. 5A and 5B may be generally identical to the upper portions of the barrel structure 310 described above with regard to FIGS. 2-4B.

To manage recoil forces from the action of the propelled stud 311, the barrel structure 515 is movable relative to the plate element 505, upwardly along direction u. To guide the movement of the barrel structure 515, the fastening mechanism 500 includes a housing element 525 attached to the plate element 505. The housing element 525 can be a generally cylindrical element with an opening 530 positioned around the barrel structure 515, and the barrel structure 515 can move upwardly along direction u within the housing element 525 and partially through the opening 530. The housing element 525 can include a top cover 535 that prevents the barrel structure 515 from exiting the housing element 525 during operation of the fastening mechanism 500. For example, the barrel structure 515 can include a flange portion 540 extending radially outwardly from the barrel structure 515, the flange portion 540 being wider than the opening 530. The flange portion 540 can move relative to the plate element 505 within the housing element 525. The housing element 525 can also provide some environmental protection for structures within the housing element 525.

To absorb some or all of the recoil energy and reduce shocks to the vehicle structures, the fastening mechanism 500 can include one or more recoil absorption elements 350 positioned between the barrel structure 515 and the housing element 525. For example, the one or more recoil absorption elements 350 can be positioned between the flange portion 540 and the housing element 525 (e.g., between the top cover 535 of the housing element 525 and the flange portion 540). Suitable materials for the recoil absorption elements 350 are described above.

FIGS. 5A and 5B illustrate a sequence of operation of the representative structure for managing and absorbing recoil energy. As shown in FIG. 5A, the barrel structure 515 is in a downward position and the recoil absorption element(s) 350 has/have not been crushed or deformed. After the stud 311 is propelled, the barrel structure 515 recoils upwardly along direction u as the recoil absorption elements crush or deform between the flange portion 540 and the top cover 535 to absorb the recoil energy. FIG. 5B shows the barrel structure 515 in a post-activation position, spaced apart from the plate element 505, and the recoil absorption element(s) 350 are deformed.

After use, the fastening mechanism 500 may be partially or fully disassembled to separate one or more portions of the launch vehicle from the landing surface 200. For example, the fasteners 510 may be removed to separate the landing support element 190 from the plate element 505, which is fastened to the landing surface 200 via the stud 311, as described above with regard to FIGS. 2-4B.

Figure 6:
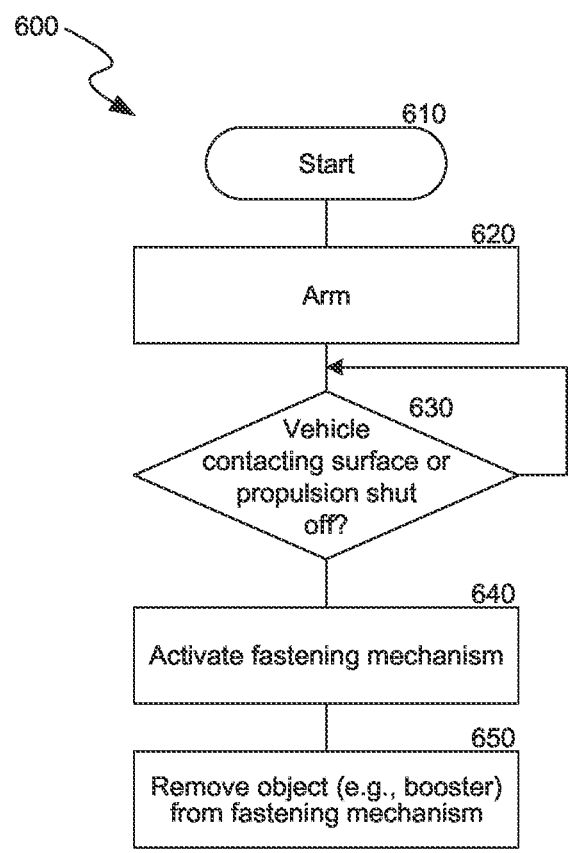
FIG. 6 is a flow chart illustrating a method of automatically fastening and subsequently removing a portion of a launch vehicle from a landing surface, in accordance with embodiments of the present technology.

FIG. 6 is a flow chart illustrating a method 600 of automatically fastening and subsequently removing a portion of a launch vehicle from a landing surface, in accordance with embodiments of the present technology. The controller 373 (see FIG. 3) can carry out the method 600, or another controller or system can carry out the method 600. Beginning at block 610, the launch vehicle (or portion thereof, such as a booster stage) is in a pre-flight condition, or is in forward flight, or is in a tail-down orientation ready for landing. In block 620, the fastening mechanism 210, 500 is armed. In block 630, the controller 373 determines if the portion of the launch vehicle has made contact with the landing surface (e.g., touched down), and/or whether the propulsion systems have been shut off. For example, systems configured in accordance with embodiments of the present technology can include motion sensors that sense settling of landing gear, and/or avionics systems can inform the controller 373 that engine power has been cut. In response to the launch vehicle touching down and/or the propulsion systems shutting off, the controller 373 can activate the fastening mechanism 210, 500 (e.g., by activating the energetic material 360), at block 640. In some embodiments, the controller 373 can delay activation of the fastening mechanism 210, 500 by an amount of time after deployment of the landing gear, after touch-down, and/or after another event. For example, in some embodiments, the controller 373 may include an instruction that only allows activation of the fastening mechanism 210, 500 if it has been at least 10 seconds since deployment of landing gear. Energy from activation of the energetic material 360 causes the stud 311 to fasten the portion of the launch vehicle (e.g., the landing support element 190) to the landing surface 200, as described above.

In block 650, crew can remove the portion of the launch vehicle from the fastening mechanism 210, 500, at least part of which can remain fastened to the landing surface 200 until it is later removed and/or the landing surface 200 is replaced. For example, the plate element 300, 505 can remain fastened to the landing surface 200 via the stud 311. In some embodiments, the barrel structure 310, 515 can remain fastened to the landing surface 200 via the stud 311. In some embodiments, removal of the portion of the launch vehicle can include removing the stud 311 from the landing surface 200 using a hydraulic tool or mechanism, a carbon arcing mechanism, and/or a drilling mechanism.

In some embodiments, alternative and/or supplemental restraints can be positioned to hold the portion of the launch vehicle in place before and/or after the landing support elements are released from the fastening mechanisms. For example, in some embodiments, releasable restraints can relieve the strain on the landing support elements and support the portion of the launch vehicle on the sea-going platform after the fastening mechanisms have been released and the platform travels to port. The portion of the launch vehicle can be supported in an upright orientation.

After the portion of the launch vehicle is removed from the fastening mechanism 210, 500 (e.g., after the landing support element 190 is removed from the fastening mechanism 210, 500), and/or after the fastening mechanism 210, 500 (or portions thereof) is removed from the landing surface 200, operators can repair the landing surface 200. For example, the hole formed by the stud 311 can be cut out, drilled, or otherwise removed from the landing surface 200, filled (e.g., with weld filler), ground smooth, and repainted, or otherwise repaired to accommodate a future landing.

One feature of several of the embodiments described above with regard to FIGS. 1-6, and with other embodiments configured according to the present disclosure, is that the fastening mechanisms can fasten anywhere on the landing surface, which is useful when it is difficult or not possible to precisely position the landing portion of the launch vehicle. Another feature is that fastening can occur quickly (relative to manual methods of attachment) which is useful in high winds and/or rough seas. Having multiple fastening mechanisms on a landing portion of a launch vehicle provides redundancy. For example, in the event one or more fastening mechanisms fail, the portion of the launch vehicle may remain attached to the landing surface, depending in part on the severity of the environmental conditions. Generally, embodiments of the present technology provide a rapid system and method for securing a rocket stage to a landing surface without the need for human intervention during the fastening process. This in turn provides operators with an increased level of safety and higher reliability for intact recovery and reuse of a rocket stage. For example, operators may be safely positioned in a remote location during landing and automatic fastening mechanism operations.

From the foregoing, it will be appreciated that specific embodiments of the disclosed technology have been described herein for purposes of illustration, but that various modifications may be made without deviating from the technology. For example, although various figures show one fastening mechanism attached to each landing support element, in some embodiments, two or more fastening mechanisms can be attached to each landing support element, or some landing support elements can exclude a fastening mechanism. Although landing elements and rocket components are described herein, fastening mechanisms configured in accordance with embodiments of the present technology can be used to bond (e.g., rapidly bond) other objects together. Although specific dimensions are provided for context and/or to indicate representative embodiments, various further embodiments can have other sizes or characteristics (for example, sizes commensurate with strength requirements or other variables, such as the material forming the landing surface 200).

Certain aspects of the technology described in the context of particular embodiments may be combined or eliminated in other embodiments. Further, while advantages associated with certain embodiments of the disclosed technology have been described in the context of those embodiments, other embodiments may also exhibit such advantages, and not all embodiments need necessarily exhibit such advantages to fall within the scope of the present technology. Accordingly, the present disclosure and associated technology can encompass other embodiments not expressly shown or described herein.

As used herein, the term "and/or" when used in the phrase "A and/or B" means "A, or B, or both A and B." A similar manner of interpretation applies to the term "and/or" when used in a list of more than two terms. As used herein, the terms "generally" and "approximately" refer to values or characteristics within a range of ±10% from the stated value or characteristic, unless otherwise indicated.

Many embodiments of the technology described herein may take the form of computer- or controller-executable instructions, including routines executed by a programmable computer or controller. Those skilled in the relevant art will appreciate that the technology can be practiced on computer/controller systems other than those shown and described herein. The technology can be embodied in a special-purpose computer, controller, or data processor that is specifically programmed, configured, or constructed to perform one or more of the computer-executable instructions described herein. Accordingly, the terms "computer" and "controller" as generally used herein refer to any data processor and can include Internet appliances and hand-held devices (including palm-top computers, wearable computers, cellular or mobile phones, multiprocessor systems, processor-based or programmable consumer electronics, network computers, mini computers, and the like). Information handled by these computers can be presented at any suitable display medium, including an LCD.

The technology can also be practiced in distributed environments, where tasks or modules are performed by remote processing devices that are linked through a communications network (e.g., a wireless communication network, a wired communication network, a cellular communication network, the Internet, and/or a short-range radio network such as Bluetooth). In a distributed computing environment, program modules and/or subroutines may be located in local and remote memory storage devices. Aspects of the technology described herein may be stored and/or distributed on computer-readable media, including magnetic or optically readable or removable computer disks, as well as distributed electronically over networks. Data structures and transmissions of data particular to aspects of the technology are also encompassed within the scope of the embodiments of the technology.

We claim:

1. An aerospace system comprising:
   a launch vehicle portion;
   one or more landing support elements carried by the launch vehicle portion and positioned to support the launch vehicle portion upon the launch vehicle portion landing on a landing surface; and
   a fastening mechanism carried by at least one of the landing support elements and configured to fasten the landing support element to the landing surface when the launch vehicle portion is on the landing surface;
   wherein the fastening mechanism comprises:
      a barrel structure positioned to receive a stud and an energetic material, the barrel structure having a breech portion and a muzzle portion; and
      a plate element comprising an interference portion positioned to capture the stud upon activation of the energetic material, wherein the interference portion comprises a through-hole in the plate element, and wherein at least part of the hole has a smaller inner diameter than an inner diameter of the muzzle portion.

2. The aerospace system of claim 1, further comprising the stud.

3. The aerospace system of claim 1, further comprising the energetic material.

4. The aerospace system of claim 1, wherein the barrel structure includes a second interference portion positioned to receive the stud upon activation of the energetic material.

5. The aerospace system of claim 1, further comprising the landing surface and a floating platform carrying the landing surface.

6. The aerospace system of claim 5, wherein the landing surface comprises a metal.

7. The aerospace system of claim 1, further comprising a recoil absorption element operatively positioned between the barrel structure and the at least one landing support element, wherein the recoil absorption element is configured to deform to absorb recoil energy from the barrel structure.

8. The aerospace system of claim 7, wherein the recoil absorption element comprises a crushable or plastically deformable structure.

9. The aerospace system of claim 1, further comprising a sabot positioned to hold the stud in the barrel structure.

10. The aerospace system of claim 1, further comprising an obturator positioned to contain the energetic material within the breech portion.

11. The aerospace system of claim 1, further comprising one or more releasable fasteners connecting the interference portion to the at least one of the landing support elements.

12. The aerospace system of claim 1, wherein:
    the launch vehicle portion is a booster stage of a launch vehicle comprising one or more upper stages;
    the booster stage comprises one or more rocket engine exhaust nozzles positioned toward an aft end of the booster stage; and
    the one or more landing support elements are positioned toward the aft end of the booster stage.

13. The aerospace system of claim 1, further comprising a track element connecting the barrel structure to the plate element, wherein the barrel structure is movable along the track element relative to the plate element.

14. The aerospace system of claim 1, further comprising:
    a recoil absorption element positioned to deform to absorb recoil energy from the barrel structure; and
    a housing element, wherein the recoil absorption element is positioned within the housing element.

15. An aerospace system comprising a fastening mechanism configured to fasten a landing support element of a portion of a launch vehicle to a landing surface when the landing support element is on the landing surface, the fastening mechanism comprising:
    a barrel structure positioned to receive a stud and an energetic material;
    a plate element positioned beneath the barrel structure, the plate element comprising a passageway positioned to receive the stud upon activation of the fastening mechanism;
    a restraint plate positioned to secure the barrel structure to the plate element; and
    a track element connecting the barrel structure to the plate element, wherein the barrel structure is movable along the track element relative to the plate element upon activation of the fastening mechanism.

16. The aerospace system of claim 15, further comprising at least one of the stud or the energetic material.

17. The aerospace system of claim 15, wherein the track element extends between the restraint plate and the plate element, and wherein the barrel structure comprises a flange portion positioned to move along the track element.

18. The aerospace system of claim 17, further comprising a recoil absorption element positioned between the restraint plate and the flange portion, wherein the recoil absorption element is configured to deform when the barrel structure moves relative to the plate element.

19. The aerospace system of claim 18, wherein the recoil absorption element comprises one or more metal tubes.

20. The aerospace system of claim 15, further comprising the landing support element, wherein the landing support element carries the fastening mechanism.

21. The aerospace system of claim 20, wherein the plate element is releasably attached to the landing support element via one or more releasable fasteners.

22. The aerospace system of claim 15, further comprising the landing surface, wherein the landing surface comprises a metal material.

23. A method of operating an aerospace system, the method comprising:
    landing a portion of a launch vehicle on a landing surface; and
    after landing, securing the portion of the launch vehicle to the landing surface using a fastening mechanism carried by the portion of the launch vehicle;
    wherein securing the portion of the launch vehicle comprises: activating an energetic material;
    propelling a stud through a barrel structure and into the landing surface; and capturing the stud against a tapered, reduced diameter interference portion of the fastening mechanism, the tapered, reduced diameter interference portion having a smaller inner diameter than an outer diameter of the stud, and in the landing surface to secure the portion of the launch vehicle to the landing surface.

24. The method of claim 23, further comprising releasing the portion of the launch vehicle from the landing surface, wherein releasing the portion of the launch vehicle from the landing surface comprises removing the stud from a portion of the fastening mechanism.

25. The method of claim 24, wherein disconnecting the portion of the launch vehicle comprises removing the stud from the interference portion.

26. The method of claim 23, wherein capturing the stud in an interference portion of the fastening mechanism comprises capturing the stud in part of the barrel structure.

27. The method of claim 23, wherein capturing the stud in an interference portion of the fastening mechanism comprises capturing the stud in part of a plate element of the fastening mechanism.

\* \* \* \* \*